July 16, 1963  V. F. SCANDALE ETAL  3,097,569
AUTOMATIC POSITIONING MEANS FOR MACHINE TOOLS
Filed Feb. 3, 1960  2 Sheets-Sheet 1

INVENTORS
VITO F. SCANDALE
RAYMOND BLANCHARD
BY
ATTORNEY

INVENTORS
VITO F. SCANDALE
RAYMOND BLANCHARD
ATTORNEY

United States Patent Office 3,097,569
Patented July 16, 1963

3,097,569
AUTOMATIC POSITIONING MEANS FOR
MACHINE TOOLS
Vito F. Scandale, Newton, and Raymond Blanchard, Natick, Mass., assignors to Raytheon Company, Lexington, Mass., a corporation of Delaware
Filed Feb. 3, 1960, Ser. No. 6,538
5 Claims. (Cl. 90—13)

The present invention relates to improvements in machine tools, such as, for example, milling machines and boring machines, and more particularly to improved apparatus for automatically effecting movement of the work piece with respect to the tool to preselected positions with precision accuracy. However, the invention is applicable to the movement of any support, carrier, or the like, where precision positioning is desired.

One of the major problems involved in precision machine tool work is that of accurately positioning the work and tool supports relative to each other in performing successive and precisely spaced operations on a work piece, and of re-establishing a preselected position of either support after the support has been moved away from the preselected position to permit inspection of the work piece. In the main, conventional machine tools are only equipped for manual positioning of the tool and work supports, such positioning being accomplished by crank operation of lead screws threaded into screw followers carried by the supports. Such machines require the use of precision blocks and micrometer indicating gauges in establishing the desired support positions, and thus require a high degree of skill on the part of the machine operators if accurate work is to be produced.

The present invention is primarily directed to the problem of manufacturing by milling, grinding, or other material removing or finishing methods from work pieces or blanks, various articles having external shapes of irregular contours axially therealong and/or radially therearound, such as is typified by turbine blades, vanes, and like articles, characterized by a large thickness to width or chord ratio, so that a cross section of such an article at stations along its major length presents a thin section shape or contour lying within a generally rectangular or arcuate area having a large thickness to width ratio, that is to say, of a generally flat rectangular or arcuate shape and cross section. While the present invention is not limited or restricted to the production by such methods of such articles as turbine blades, compressor vanes, buckets and the like, it is particularly adapted thereto because the conditions and problems to the solution of which the invention is directed, are met with an accentuated degree in the production of such articles by automatic or semi-automatic power driven machines.

An object of the present invention is to provide improvements in apparatus and methods for causing a support to follow a predetermined path and for causing a work piece associated with the support to move relative to a tool in a path determined by the path of movement of the support relative to the tool.

It is another object of the present invention to provide machine tool support positioning facilities of relatively simple arrangement which may be easily controlled and that are completely reliable in operation.

It is a further object of the present invention to provide positioning facilities of the character described which may be selectively employed at will to effect movement of the work support to a preselected position.

Other objects and advantages of the present invention should be readily apparent by reference to the following specification considered in conjunction with the accompanying drawings forming a part thereof, and it is to be understood that any modifications may be made in the exact structural details there shown and described within the scope of the appended claims without departing from or exceeding the spirit of the invention. In the drawings:

Figure 1:
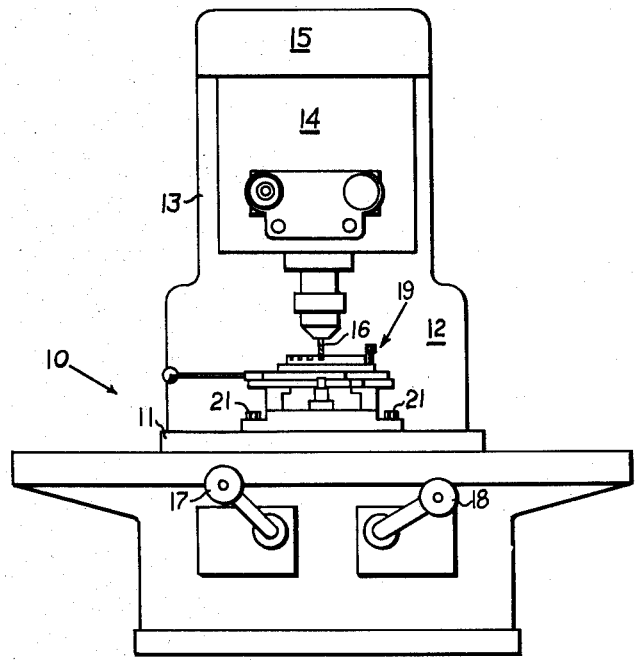
FIG. 1 is a front elevation of a machine embodying the present invention.

Apparatus embodying the invention can be constructed alternatively as a special purpose machine or as an attachment designed for use with a conventional machine tool of standard manufacture. In the embodiment illustrated in the drawings the invention comprises specially constructed automatic work piece positioning means wherein the portion or portions of the work piece in which the desired surface is to be formed are consecutively located over the axis of and movable with a rotatable cam having a periphery formed in a predetermined manner as determined by the surface to be formed. The invention with the work piece attached, which work piece for the embodiment described herein is a turbine wheel having longitudinally disposed blades, is used in conjunction with cross slide and table feeding mechanisms as an attachment on a standard milling machine of conventional design.

With reference now to FIG. 1, the conventional milling machine parts comprise a bed portion 10 supporting a translatable table 11 and having rising therefrom a column portion 12 on which is guided the cross slide or ram member 13. This member is provided with ways as at 14 for guiding the vertical movement of the cutter head or slide 15 bearing the rotatable cutter 16. Longitudinal movement of table 11 on bed 10 may be effected either by power or manually by operation of the pilot wheel 17, while transverse movement of the ram 13 may be effected through suitable connections by operation of the pilot wheel 18. The work piece positioning means indicated generally by the numeral 19 is attached to the bed 10 as by bolts 21 in conventional manner.

Figure 3:
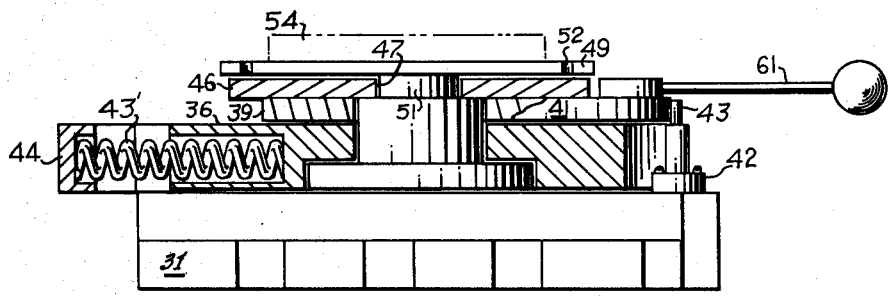
FIG. 3 is a longitudinal sectional view in part through the mechanism of FIG. 2.
Figure 2:
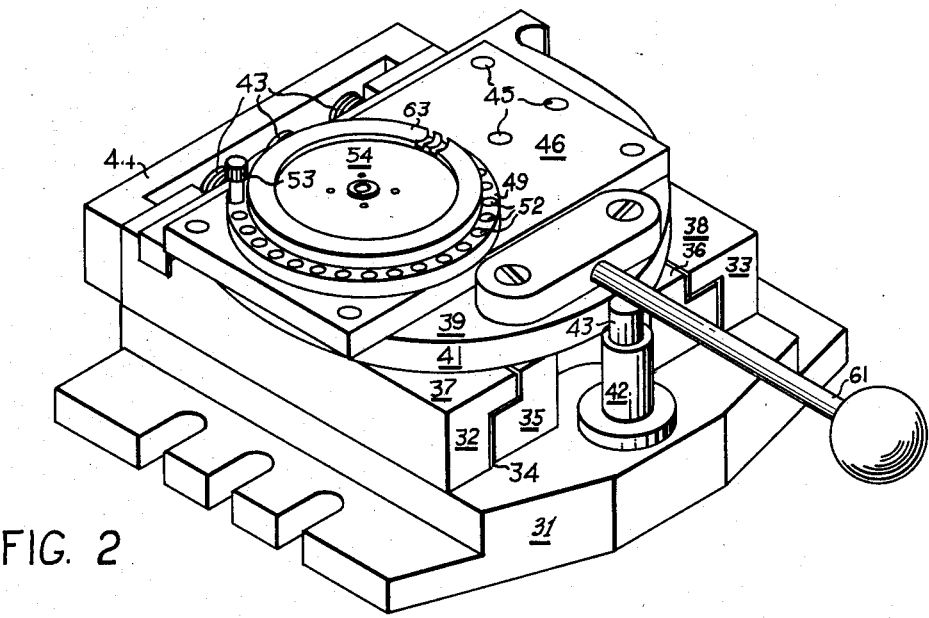
FIG. 2 is a pictorial view of work piece position controlling mechanism in accordance with the invention.

With reference now to FIG. 2 and FIG. 3 the work piece positioning means is comprised of a bracket 31 with upstanding L-shaped side portions 32—33 to form a slideway 34. Slidably disposed in the slideway 34 is a bed member 35 formed for accurate fit with the surfaces of the slideway 34 and having a flat top surface 36 coplanar with the top surfaces 37—38 of the bracket side portions 32—33. Attached to the bed 35 and rotatable about its axis is a relatively thin cam 39 more thoroughly discussed hereinafter having a periphery or contour 41 formed in accordance with the desired surface to be formed. Affixed to one end of the bracket 31 is an idler 42 having a rotatable end portion 43 adapted for contact with the periphery 41 of the cam 39. The idler 42 is longitudinally located with respect to the slideway 34 to permit movement of the bed 35 toward and from the idler 42 as determined by the configuration of the cam 39. Springs 43' retained in position by an end plate 44 urge the bed 35 toward the idler 42 and maintain the cam 39 and idler 42 in contact. Fixedly attached to the upper surface of the cam 39 as by screws 45 is a flat plate 46 having a recess 47 adjacent one end and concentric about a point on the longitudinal axis of the plate 46, which axis also intersects the cam axis 48 (see FIG. 4). Rotatably carried in the recess 47 of plate 46 is a circular work piece indexing plate 49 having a boss 51 adapted for accurate fit in recess 47 and a plurality of indexing passages 52 formed adjacent its periphery. Pin 53 is adapted to be inserted in sequence through each of the passages and one end thereof is received by a suitable recess in the plate 46 to permit consecutive portions of the work piece 54 to be rotated the proper amount to bring them into position for forming a surface therein. For the turbine wheel shown, each passage 52 corresponds to a blade so that as each surface is formed the turbine wheel may be rotated the proper amount for accurate location of the next surface. The work piece or turbine wheel blank 54 is circular with an upstanding ridge at its periphery in which the blades are formed by milling out undesired portions of the ridge. The blank 54 may be removably but non-rotatably attached to the indexing plate 49 by forming two oppositely disposed projections on the back of the blank which fit into recesses in the indexing plate (not shown). A bolt or the like passing through the center of the turbine wheel blank 54 and threadable into the indexing plate 49 may be used to hold the turbine wheel blank and indexing plate in abutting relationship. Arm 61 is fixedly connected to the cam 39 to permit manual rotation of the cam about its axis 48. While manual indexing and cam rotating means have been shown it is within the scope of the invention and the ability of those skilled in the art to provide automatic rotation and indexing by conventional means. Further, if desired the cam 39 may be located below the bed 35 and enclosed to protect it from foreign matter which may collect on the periphery 41 of the cam and result in an inaccurately formed surface. In this case the plate 46 and indexing plate 49 may be simply formed and attached to the cam in the manner described through the bed 35.

The cam 39 and a work piece 54 mounted on the device in the example machine hereof are rotated about the cam axis 48 with the cam controlling through the idler, the rotary and the cross feeding movements of the bed 35 toward and away from the cutter 16 to cause the cutter to mill out precisely the required contours of the finished article as dictated and controlled by the contour surface 41 of the cam 39.

In accordance with the present invention there is provided a cam 39 having therearound a peripheral pattern surface which has been generated from and is an expanded or enlarged contour surface of the required contour to provide simultaneously the correct rotary motion about the axis of the cam and translatory motion of the work piece 54 with respect to the cutter 16. This motion causes a portion of the work piece 54 to be positioned along a particular path of travel of the required contour of the surface to be machined from the work piece relative to the cutter 16. The contours radially along the width of the pattern surface of the cam correspond to and provide expanded reproductions of the contours radially of and angularly around the finished article.

Figure 4:
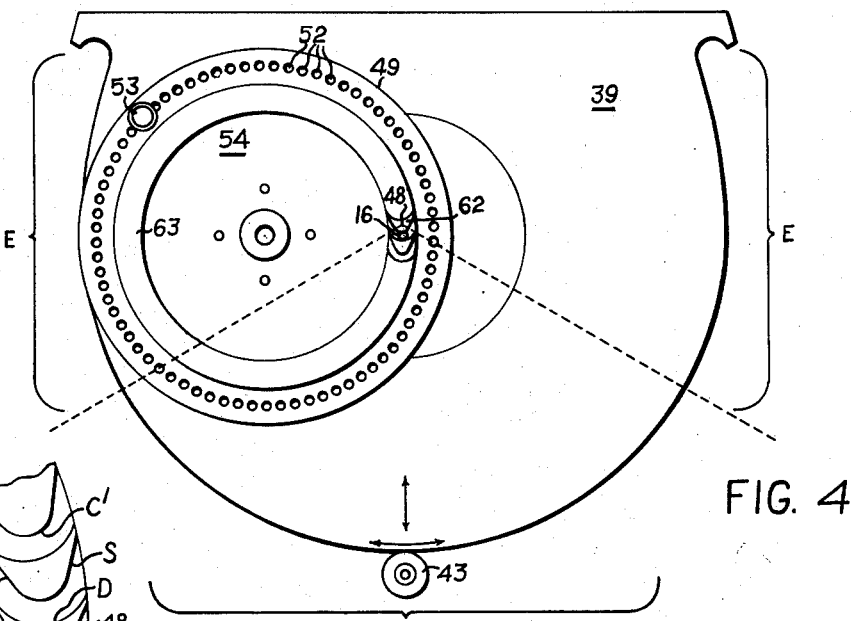
FIG. 4 is a top view of the cam and indexing plate with a turbine wheel blank in position for cutting right hand buckets.
Figure 5:
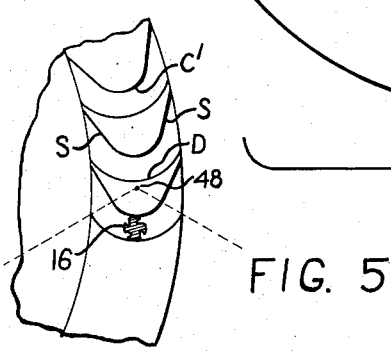
FIG. 5 is a fragmentary view of a portion of FIG. 4 on an enlarged scale to more clearly show the relation of the cutter, the turbine buckets, and the axis of the cam.

Referring to FIG. 4 and FIG. 5 I have shown a top view of the positioning means and an enlarged portion thereof. For purposes of clarity only the cam 39, idler rotatable end portion 43, indexing plate 49, work piece 54, and cutter 16 are shown in operative relationship. A finished turbine blade 62 having the required contour is shown which is required to be reproduced at corresponding stations on the work piece. The contour of the cam is shown surrounding and generated about the axis 48 of revolution of the cam 39, any desired or suitable method of generation having been utilized. Thus, the contour surface 41 around the cam 39 is an enlarged or expanded contour required to produce the necessary path of travel relative to the cutter 16 to form the desired surface. It is to be noticed, for instance, that the center portion C of the cam contour or periphery has the same radius for simultaneously providing the arcuate surfaces C'–D while the end portions E of the periphery of the cam have a constantly increasing radius for providing the flat surfaces S. Inspection of FIG. 4 and FIG. 5 will show that the cutter 16 is provided with a diameter equal to the required spacing between surface D and surfaces C'–S and is offset from the cam axis 48 to simplify design of the cam 39. Inasmuch as the contours around the cam 39 are generated on radii of great length with respect to the surface to be formed, the contours on the cam are thus expanded, smoothed out, and made less severe so that less severe or critical pressure angles will be presented between the cam 39 and idler 42.

To facilitate understanding of the operation and how the invention is used it will be assumed that it is desired to form a turbine wheel having identical blades extending at right angles to the axis of the wheel. After formation of the proper contour of a cam in conventional manner to produce the proper rotary and translatory motion of the turbine wheel blank as described hereinbefore and after mounting a turbine wheel blank on an indexing plate having the proper number of properly spaced indexing passages, the positioning device is attached to the table 11 of the milling machine and located by means of wheels 17—18 with respect to the cutter 16 such that the axis of the cutter 16 passes through the center of the ridge 63 from which the blades are to be formed, which center also intersects the axis 48 of the cam. The turbine wheel is then rotated away from the cutter 16 by arm 61 and the cutter 16 is lowered to engage one side of the ridge 63. Thereafter the cam 39 is rotated by means of arm 61 and at least one surface, and preferably two oppositely disposed surfaces, one milled. The turbine wheel blank is then indexed and the arm rotated in the reversed direction to cut a new surface or surfaces. In this manner all of the blades 62 may be simply and quickly formed with a high degree of accuracy. In fact, turbine wheels formed in the above-described manner, formed by inexperienced personnel, did not require further processing and more importantly, did not have to be balanced as has previously been the case.

As shown in FIG. 2 and FIG. 4, the indexing plate is located to the left of the cam axis. When the indexing plate is in this location, right hand buckets will be formed. On the other hand, when the indexing plate is similarly located to the right of the cam axis, left hand buckets identical to the right hand buckets will be formed.

It will be evident that various changes, modifications, substitutions, adaptations, and eliminations may be resorted to without departing from the broad spirit and scope of the present invention, and hence, it is not intended to limit the present invention in all respects to the exact and specific disclosure hereof, except as may be required by intended limitations thereto appearing in the claims hereto appended.

For example, where it is desired to form radially extending blades on a turbine wheel, the indexing plate may be mounted vertically (at right angles) to the cam and oriented such that the axis of the cam passes diametrically through the turbine wheel blank.

What is claimed is:

1. A work piece position controlling mechanism for application with a machine tool of the type having a base member, a work carrier table translatable on the base member, and a tool carrier translatable transversely as respects the direction of movement of the work carrier comprising: a bracket for attachment to the work carrier table of the machine tool, said bracket being formed with a slideway; an idler affixed to said bracket adjacent one end of said slideway; a bed member disposed in said slideway movable toward and from said idler; a cam member having large radii relative to the corresponding dimensions of respective portions of the workpiece to be formed, said cam being carried by said bed member and rotatable about its axis; the periphery of said cam being adapted for and a portion thereof being in contact with said idler, the periphery of said cam being formed to cause said bed to move toward and from said idler in a predetermined manner in accordance with a desired surface to be formed on such work piece as said cam is rotated about its axis, said cam member, said bed member, and said work carrier table being relatively closely positioned with respect to one another; and rotatable workholding means concentric about a second axis passing through said cam and parallel to said cam axis for attaching a circular work piece thereto, means for releasably securing said workholding means in fixed relation to said cam and in movable relation to said tool carrier whereby different peripheral and consecutive portions of such work piece may be consecutively located over said axis with said cam axis passing through the portion of such work piece in predetermined relationship to the desired surface to be formed as said cam is rotated when said workholding means is secured in fixed relation to said cam.

2. A work piece position controlling mechanism for application with a machine tool of the type having a base member, a work carrier table translatable on the base member, and a tool carrier translatable transversely as respects the direction of movement of the work carrier comprising: a bracket for attachment to the work carrier table of the machine tool, said bracket being formed with a slideway; an idler affixed to said bracket adjacent one end of said slideway; a bed member disposed in said slideway movable toward and from said idler; a cam member having large radii relative to the corresponding dimensions of respective portions of the workpiece to be formed, said cam being carried by said bed member and rotatable about its axis; the periphery of said cam being adapted for and a portion thereof being in contact with said idler, the periphery of said cam being formed to cause said bed to move toward and from said idler in a predetermined manner in accordance with a desired surface to be formed on such work piece as said cam is rotated about its axis, said cam member, said bed member, and said work carrier table being relatively closely positioned with respect to one another; rotatable workholding means concentric about a second axis passing through said cam and parallel to said cam axis for attaching a circular work piece thereto, means for releasably securing said workholding means in fixed relation to said cam and in movable relation to said tool carrier whereby different peripheral and consecutive portions of such work piece may be consecutively located over said cam axis with said cam axis passing through the portion of such work piece in predetermined relationship to the desired surface to be formed as said cam is rotated when said workholding means is secured in fixed relation to said cam; and means for rotating said cam.

3. In combination: a structural means forming a slideway; an idler fixed to one end of said structural means; a bed member disposed in said slideway moveable to and from said idler; a cam member carried by said bed member and rotatable about its axis, the periphery of said cam being adapted for and a portion thereof being in contact with said idler; rotatable workholding means concentric about a second axis passing through said cam and parallel to said cam axis for attaching a work piece thereto; and means for releasably securing said workholding means in successive fixed relations to said cam.

4. Machine tool apparatus including means disposed in moveable relation to a tool carrier comprising: structural means forming a slideway; an idler affixed to one end of said structural means; a bed member disposed in said slideway moveable to and from said idler; a cam member carried by said bed member and rotatable about its axis, the periphery of said cam being adapted for and a portion thereof being in contact with said idler; rotatable workholding means concentric about a second axis passing through said cam and parallel to said cam axis for attaching a work piece thereto; and means for releasably securing said workholding means in fixed relation to said cam and in moveable relation to said tool carrier.

5. Machine tool apparatus disposed in moveable relation to a tool carrier comprising: support means; an idler affixed to one end of said support means; a bed member moveably disposed in said support means; a cam member carried by said bed member and rotatable about its axis, the periphery of said cam being adapted for and a portion thereof being in contact with said idler; rotatable workholding means concentric about a second axis of said cam and parallel to said cam axis for attaching a work piece thereto; and means for releasably securing said workholding means in fixed relation to said cam and in moveable relation to said tool carrier.

References Cited in the file of this patent

UNITED STATES PATENTS

| 733,521 | Walcutt | July 14, 1903 |
| 1,973,344 | Hanson | Sept. 11, 1934 |
| 2,109,454 | Becker | Mar. 1, 1938 |
| 2,452,988 | Brown | Nov. 2, 1948 |
| 2,714,325 | Junker | Aug. 2, 1955 |

FOREIGN PATENTS

| 538,579 | Canada | Mar. 26, 1957 |